(No Model.)

G. F. SIMONDS.
BALL BEARING.

No. 466,440. Patented Jan. 5, 1892.

Witnesses:
Robert Garrett
J. A. Rutherford

Inventor:
George F. Simonds
By James L. Norris
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 466,440, dated January 5, 1892.

Application filed April 23, 1891. Serial No. 390,158. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

This invention relates to that class of ball-bearings in which a number of spherical rollers or balls are arranged to revolve in all directions in contact with concentric bearing-surfaces for the purpose of resisting radial pressure, and comprising also other spherical rollers or balls arranged to revolve in all directions in contact with parallel plane bearing surfaces for the purpose of resisting thrust or end pressure.

My present invention consists in the construction, arrangement, and combination of parts in a ball-bearing more particularly adapted for application to a vertical shaft or spindle, as hereinafter more fully set forth.

Figure 1:
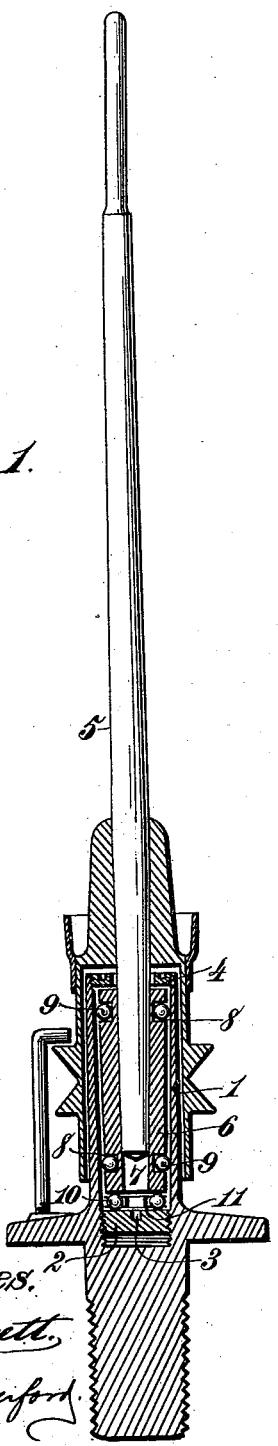
Figure 2:
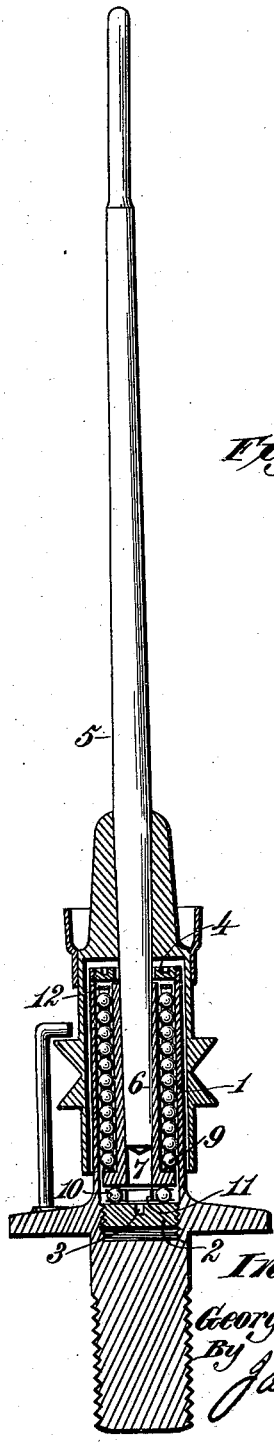

In the annexed drawings, illustrating the application of my invention to spinning-spindles, Figure 1 is a sectional elevation showing the balls for resisting radial pressure arranged in annular grooves or recesses between slightly-tapering concentric bearing-surfaces and the balls for supporting thrust or end pressure confined in a cage arranged between parallel plane bearing-surfaces, one of which is supported in a stationary part and adjustable toward the rotary plane bearing-surface; and Fig. 2 is a similar view in which both groups of balls are caged.

Referring to the drawings, the numeral 1 designates a hollow cylinder, which may be fixed to a suitable support. One end of this cylinder is internally screw-threaded to receive and engage an externally-screw-threaded disk 2, having in its center a recess, groove, or slot 3 to receive a screw-driver or other suitable instrument by which said disk can be rotated or adjusted to proper position within the inclosing cylinder. The other end of the hollow cylinder 1 is internally screw-threaded to receive and engage an annular externally-screw-threaded cap 4, that can be screwed into place by means of a spanner. The opening in the center of the annular cap 4 is sufficiently large to permit the insertion and free rotation of the spindle 5 and its ready withdrawal when required. The cylinder 1 incloses a sleeve 6, having a slightly tapering longitudinal bore 7, that is adapted to have a wedging engagement with a corresponding tapering surface of the spindle 5, so that said sleeve and spindle may rotate together and yet be readily detached or drawn apart when necessary. As shown in Fig. 1, the inner surface of the cylinder 1 and the outer surface of the sleeve 6 may be made correspondingly tapering or conoidal from one end to the other, and the outer surface of the said conoidal-shaped sleeve 6 may be provided with annular grooves or recesses 8 to receive circular groups of spherical rollers or balls 9, adapted to revolve freely in all directions in bearing contact with concentric surfaces of said cylinder and sleeve for the purpose of resisting radial pressure and to enable the spindle to rotate without wabbling. It will be observed that the annular grooves, channels, or recesses 8 have each two plane surfaces parallel to each other and substantially at right angles to the concentric surfaces on which the balls 9 roll. The said balls 9 are thus arranged to bear only at diametrically-opposite points against and roll upon the concentric surfaces and are retained in place by the parallel plane surfaces of the annular channels 8, in which they are placed. The end-thrust of the sleeve 6 is supported by a number of spherical rollers or balls 10, confined in a cage 11, which may be constructed in the manner described in Letters Patent No. 449,968, granted to me April 7, 1891. These balls 10 are adapted to revolve freely in all directions in contact with the parallel plane bearing-surfaces of the adjustable disk 2 and the adjacent end of the sleeve 6, as shown. By means of the adjustable disk 2 and the tapering surfaces of the cylinder 1 and conoidal-shaped sleeve 6 the balls 9 for sustaining radial pressure can be readily brought to a proper bearing, so that they will roll freely in contact with the concentric bearing-surfaces without any tendency to wedging. It will be seen, also, that the construction and arrangement of the externally-threaded disk 2 and the externally-threaded annular cap 4 enables either or both of these parts to be so adjusted with relation to the cylinder 1 and sleeve 6 as to prevent any excessive endwise movement of the spindle.

In Fig. 2 I have shown the cylinder 1 and sleeve 6 as formed without tapering surfaces, and the balls 9 for sustaining radial pressure, instead of being located in grooves, are confined in an annular cage 12, that is preferably constructed in the manner described in Letters Patent No. 449,963, granted to me April 7, 1891. It will be observed that the annular cap 4 retains the balls and the sleeve 6 within the cylinder or casing, and that the spindle 5, which is in wedging engagement with said sleeve, can be readily withdrawn when necessary without disturbing or removing the ball-bearings. Should it be necessary to adjust the disk 2 to give a nice adjustment to the sleeve 6 or the balls 9 for any purpose, the required adjustment can be readily accomplished by simply withdrawing the spindle and then passing a suitable instrument through the cap 4 and sleeve 6 into engagement with the disk 2, which can be thus rotated or adjusted. In like manner, on removing the spindle and attached whirl any required adjustment can be given to the annular cap or retaining-ring 4 by means of a spanner.

The metal surfaces against which the several groups of balls act may be hardened in a well-known manner. In a bearing of this description the rolling action of the balls will reduce friction to a minimum, so that little or no oil will be required.

What I claim as my invention is—

1. In a ball-bearing, the combination of a cylinder or casing, a sleeve attached to a spindle and surrounded by said casing, an annular adjustable cap located in one end of the cylinder and surrounding the spindle, an adjustable disk located in the other end of said cylinder, spherical rollers or balls adapted to revolve in all directions between and against the parallel plane bearing-surfaces of said disk and the adjacent end of the sleeve for the purpose of resisting thrust or end pressure, and other spherical rollers or balls adapted to revolve in all directions between and in contact with concentric surfaces of said cylinder and sleeve for the purpose of resisting radial pressure, substantially as described.

2. In a ball-bearing, the combination of a conoidal-shaped sleeve and an inclosing cylinder, each having tapering concentric surfaces, a spindle attached in said sleeve, an adjustable disk located in one end of the cylinder, spherical rollers or balls adapted to revolve in all directions in contact with parallel plane bearing-surfaces of said disk and sleeve for the purpose of resisting thrust or end pressure, and other spherical rollers or balls adapted to revolve in all directions in contact with concentric surfaces of said cylinder and sleeve for the purpose of resisting radial pressure, substantially as described.

3. In a ball-bearing, the combination of a conoidal-shaped sleeve and an inclosing cylinder, each having tapering concentric surfaces, one of which is provided with annular grooves, spherical rollers or balls located in said grooves and adapted to revolve freely in all directions for the purpose of resisting radial pressure, an adjustable disk located in one end of the cylinder, spherical rollers or balls adapted to revolve in all directions against parallel plane bearing-surfaces of said disk and sleeve for the purpose of resisting thrust or end pressure, a cage in which said balls are retained, and an annular cap located in the other end of the cylinder, substantially as described.

4. In a ball-bearing, the combination of a cylinder or casing, an inclosed conoidal-shaped sleeve having its exterior provided with annular grooves or recesses having parallel plane surfaces substantially at right angles to concentric surfaces of said cylinder and sleeve, and spherical rollers or balls that are located in said grooves and which bear only at diametrically-opposite points against and roll upon concentric surfaces and are retained in place by the parallel plane surfaces of said grooves, substantially as described.

In testimony whereof I have hereunto set my hand and affixed my seal in presence of two subscribing witnesses.

GEO. F. SIMONDS. [L. S.]

Witnesses:
 JAMES L. NORRIS,
 JAMES A. RUTHERFORD.